United States Patent
McCool et al.

(10) Patent No.: US 8,286,130 B2
(45) Date of Patent: Oct. 9, 2012

(54) METHODS AND SYSTEMS FOR USING TYPE MODELS TO GENERATE AN IMPLEMENTATION OF A TYPE

(75) Inventors: Michael David McCool, Waterloo (CA); Stefanus Jakobus Du Toit, Kitchener (CA)

(73) Assignee: Intel Corporation, Santa Clara, CA (US)

( * ) Notice: Subject to any disclaimer, the term of this patent is extended or adjusted under 35 U.S.C. 154(b) by 1526 days.

(21) Appl. No.: 11/739,561

(22) Filed: Apr. 24, 2007

(65) Prior Publication Data

US 2008/0270979 A1    Oct. 30, 2008

(51) Int. Cl.
*G06F 9/45* (2006.01)
(52) U.S. Cl. ......................................................... 717/108
(58) Field of Classification Search .................... 717/108
See application file for complete search history.

(56) References Cited

U.S. PATENT DOCUMENTS

| | | | | |
|---|---|---|---|---|
| 6,077,313 A * | 6/2000 | Ruf | ................................ | 717/155 |
| 6,738,756 B1 * | 5/2004 | Brown et al. | ......................... | 1/1 |
| 6,912,647 B1 * | 6/2005 | Blandy | ............................ | 712/24 |
| 7,694,107 B2 * | 4/2010 | Lin et al. | .......................... | 712/28 |
| 2004/0205062 A1 * | 10/2004 | Brown et al. | ..................... | 707/3 |
| 2006/0253836 A1 * | 11/2006 | Hiroshi | ......................... | 717/114 |
| 2007/0294663 A1 * | 12/2007 | McGuire et al. | .............. | 717/108 |

* cited by examiner

*Primary Examiner* — John Chavis
(74) *Attorney, Agent, or Firm* — Blakely, Sokoloff, Taylor & Zafman LLP

(57) ABSTRACT

A method for using type analysis to generate an implementation of a type includes the step of identifying a request to generate a first implementation of a type. A type model associated with the type is received. A second implementation of the type model is identified as suitable for a high-performance implementation. The second implementation is generated on a target processor. The second implementation is represented as the first implementation.

88 Claims, 5 Drawing Sheets

METHODS AND SYSTEMS FOR USING TYPE MODELS TO GENERATE AN IMPLEMENTATION OF A TYPE

FIELD OF THE INVENTION

The present invention relates to methods and systems for type analysis. In particular, the present invention relates to methods and systems for using type models to generate an implementation of a type.

BACKGROUND OF THE INVENTION

A new generation of massively parallel processors, including graphics processing units (GPUs), the IBM Cell BE processor, and other multi-core or vector processors, can offer faster computation than traditional processors by an order of magnitude. Achieving the potential performance of these processors typically requires a detailed understanding of processor hardware and memory architectures as well as of sophisticated parallel programming techniques. For example, typically programming applications for graphical processing units may require programmers to learn a large number of graphics concepts as well as understanding different optimizations required to achieve optimum performance in an environment in which the cache, memory and execution architectures may differ significantly from that of traditional processing units. Additionally, parallel programming itself is not intuitive for many programmers, as it requires techniques and algorithms that are not required for traditional serial programming and introduces numerous new development and debugging challenges.

SUMMARY OF THE INVENTION

Because of the memory, communication, processing, and architectural features of massively parallel processors, new development approaches and programming systems may be used to improve the level of performance achievable with these processors. One system that may be used to improve a performance level includes a mechanism for analyzing data types defined by a user, possibly in an existing language originally designed only for serial computation, such as C++, and transforming the data types so for improved performance in parallel architectures.

In one aspect, a method for using type analysis to generate an implementation of a type includes the step of identifying a request to generate a first implementation of a type. A type model associated with the type is received. A second implementation of the type model is identified as suitable for a high-performance implementation. The second implementation is generated on a target processor. The second implementation is represented as the first implementation.

In one embodiment, a second implementation of the type model is identified as suitable for a high-performance implementation, responsive to an analysis of the type model. In another embodiment, the type model is modified and an implementation of the modified type model is generated. In still another embodiment, the type model includes a description of a data layout of an implementation of the type. In yet another embodiment, the type model includes a description of a relationship between an implementation of the type model and a non-local variable.

In one embodiment, the type model is associated with a data type. In another embodiment, the type model is associated with a function type. In still another embodiment, the type model is associated with a type replacing a basic type provided by a programming language. In yet another embodiment, the type model is associated with a composite type comprising a plurality of types replacing basic types provided by a programming language.

In another aspect, a system for using type analysis to generate an implementation of a type includes a type translator and a code generator. The type translator identifies a request to generate a first implementation of a type, analyzes a type model associated with the type, and identifies a second type model as suitable for a high-performance implementation, the type model including a description of a data layout of an implementation of the type. The code generator generates an implementation of the second type model on a target processor and represents the generated implementation as the first implementation. In one embodiment, the type translator communicates with a type analysis system. In another embodiment, the type translator includes a receiver retrieving a type model from a storage device.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
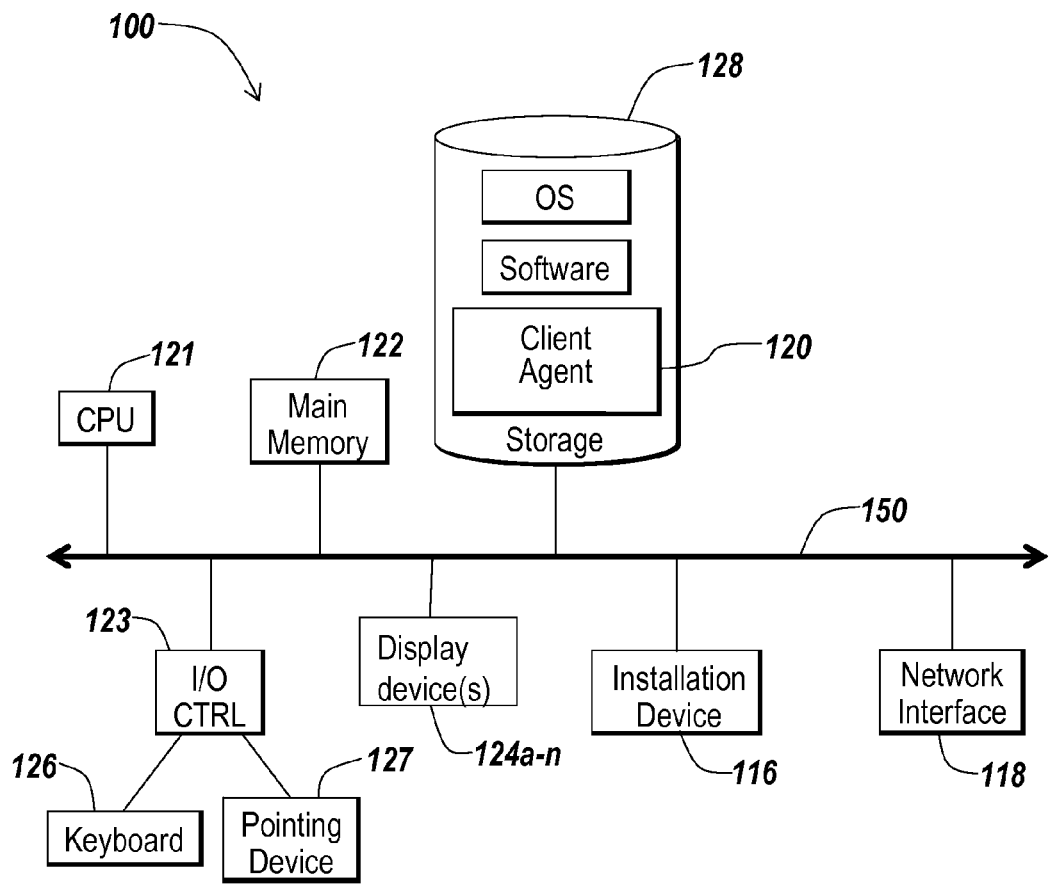
FIGS. 1A-1C are block diagrams depicting an embodiment of a computer useful in connection with the methods and systems described herein.

FIG. 1A depicts a block diagram of a computing device 100 useful for practicing an embodiment of a method for type analysis in a system for code generation. As shown in FIG. 1, each computing device 100 includes one or more central processing units 121, and one or more main memory units 122. As shown in FIG. 1, a computing device 100 may include a visual display device 124, a keyboard 126 and/or a pointing device 127, such as a mouse. A computing device may also include installation devices, which may or may not be the same as the central processing units.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; those manufactured by Sun Microsystems Inc. of Mountain View, Calif.; or those manufactured by Advanced Micro Devices of Sunnyvale, Calif. The computing device 100 may be based on any of these processors, or any other processor capable of operating as described herein.

Figure 1B:
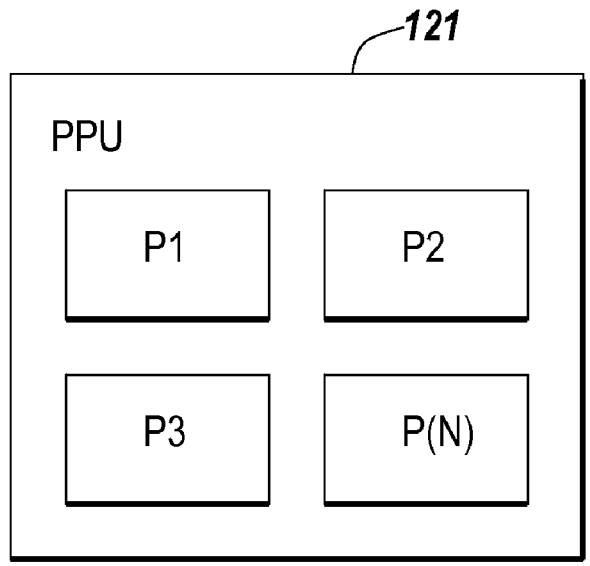
Figure 1C:
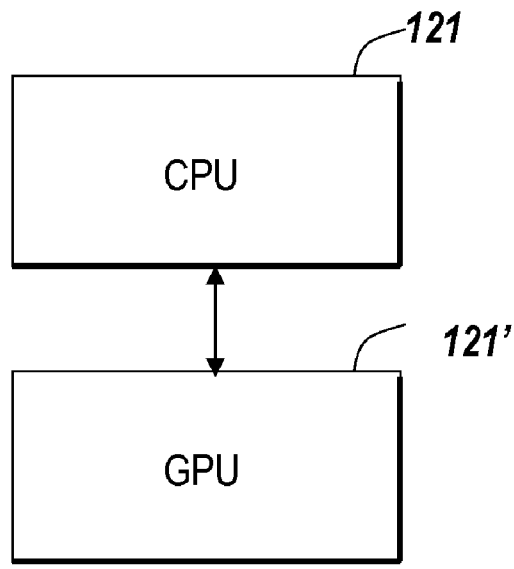

As shown in FIG. 1B, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a power processor element and a plurality of synergistic processing elements, the power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In some embodiments, the computing device 100 may comprise a graphics processing unit. In one of these embodiments, depicted in FIG. 1C, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

The computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices may be present in the computing device 100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif.

In some embodiments, the computing device 100 may comprise or be connected to multiple display devices 124a-124n, which each may be of the same or different type and/or form. As such, any of the I/O devices and/or the I/O controller 123 may comprise any type and/or form of suitable hardware, software, or combination of hardware and software to support, enable or provide for the connection and use of multiple display devices 124a-124n by the computing device 100.

In further embodiments, an I/O device may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, an Infiband interconnect fabric, a Myrinet interconnect fabric, or a Serial Attached small computer system interface bus.

A computing device 100 of the sort depicted in FIG. 1 typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MAC OS, manufactured by Apple Computer of Cupertino, Calif.; OS/2, manufactured by International Business Machines of Armonk, N.Y.; Solaris Operating System, manufactured by Sun Microsystems, Inc. of Santa Clara, Calif.; and Linux, a freely-available operating system distributed by Caldera Corp. of Salt Lake City, Utah, or any type and/or form of a Unix operating system, among others. In some embodiments, the computing device 100 operates under the control of an operating system supporting parallel processing. In one of these embodiments, the operating system provides functionality for managing shared resources, scheduling, and coordination of processing performed by multiple processors. In other embodiments, the computing device 100 operates under a minimal Basic Input/Output System but has the ability to load a standard operating system, such as WINDOWS CE or other WINDOWS operating system.

The computing device 100 can be any workstation, desktop computer, laptop or notebook computer, server, handheld computer, mobile telephone, game console, any other computer, or other form of computing or telecommunications device that is capable of communication and that has sufficient processor power and memory capacity to perform the operations described herein.

Figure 2:
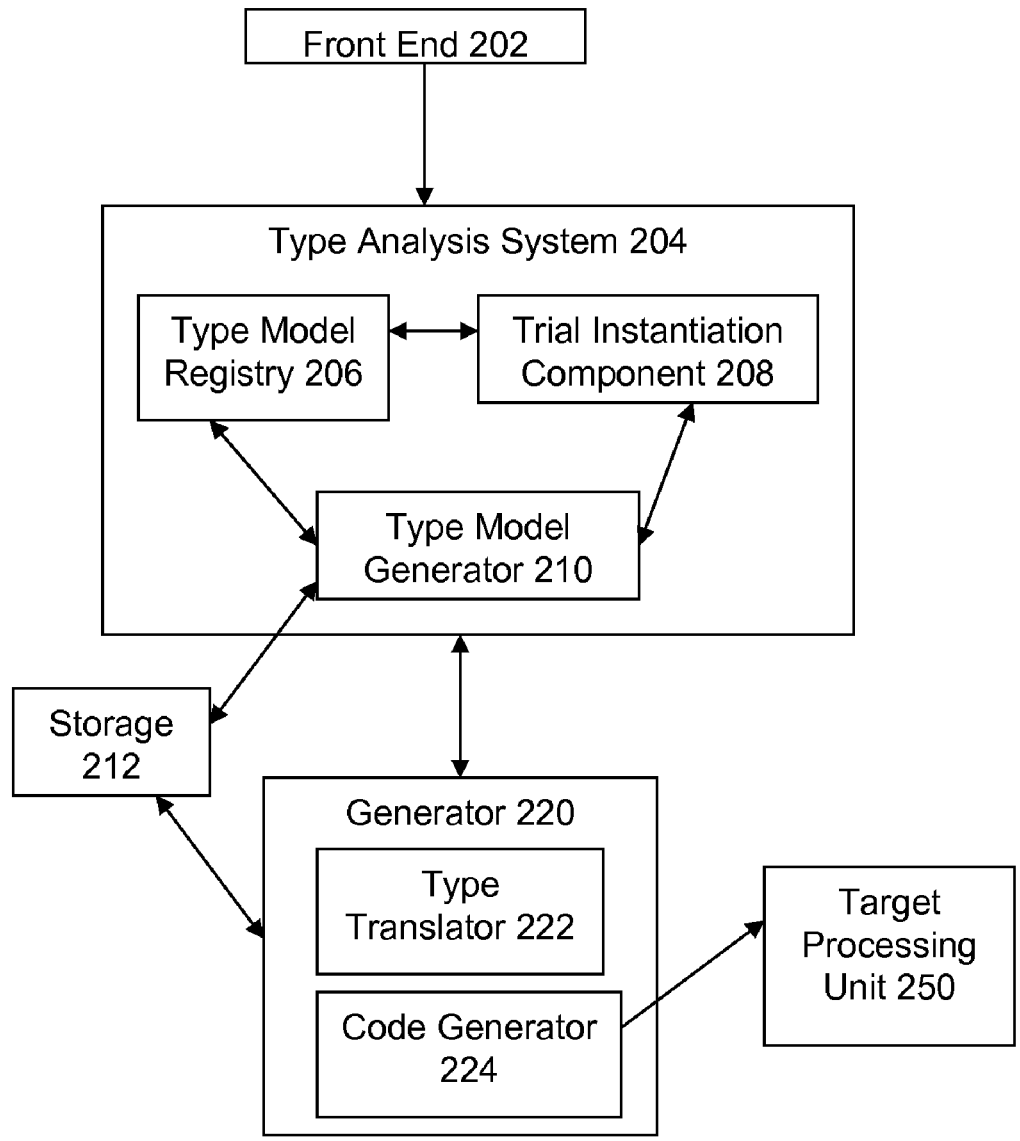
FIG. 2 is a block diagram depicting one embodiment of a system for type analysis and code generation.

Referring now to FIG. 2, a block diagram depicts one embodiment of a system for identifying a structure of a type to generate a model of the type. In brief overview, the system includes a front end component 202, a type analysis system 204, storage device 212, a generator 220, and a target processing unit 250. The type analysis system 204 includes a type model registry 206, a trial instantiation component 208, and a type model generator 210. In some embodiments, the type analysis system 204 includes a means for overloading a dynamic construction side-effect of a subtype associated with the type. The generator 220 is in communication with the type analysis system 204, with the storage device 212, and with the target processing unit 250. The generator 220 includes a type translator 222 and a code generator 224.

Figure 3:
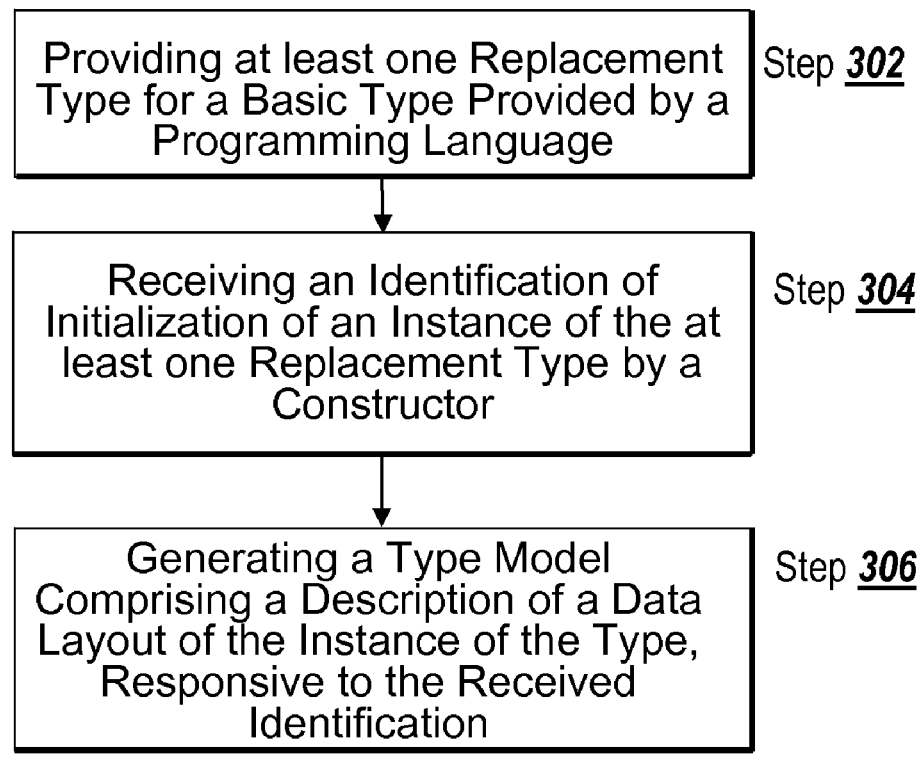
FIG. 3 is a flow diagram depicting one embodiment of the steps taken in a method for type analysis in a system for dynamic code generation.

Referring now to FIG. 3, and in connection with FIG. 2, a flow diagram depicts one embodiment of the steps taken in a method for identifying a structure of a type to generate a model of the type. In brief overview, at least one replacement type for a basic type is provided, the basic type provided by a programming language (step 302). An identification of initialization, by a constructor, of an instance of the at least one replacement type is received (step 304). A type model is generated responsive to the received identification, the type model comprising a description of a data layout of the instance of the type (step 306). In one embodiment, type analysis refers to a process by which a structure of a data structure type or of a function type declared in a programming language can be determined by instrumenting its construction process.

At least one replacement type for a basic type is provided, the basic type provided by a programming language (step 302). In some embodiments, a type refers to an abstract data type and is defined only by its external interface (including visible state, operations, and any non-local state read from or written to), independent of the implementation. In one embodiment, the front end component 202 provides the at least one replacement type. In another embodiment, the front end component 202 provides a new type providing functionality substantially similar to functionality provided by the basic type. In still another embodiment, the front end component 202 provides a composite type comprising a plurality of basic types provided by a programming language. In still even another embodiment, the front end component 202 provides a composite type comprising a plurality of replacement types. In yet another embodiment, the front end component 202 provides a composite type comprising at least one of a plurality of replacement types and a plurality of basic types, In some embodiments, the front end component 202 provides at least one user-generated replacement type for a basic type provided by a programming language. In other embodiments, the front end component 202 provides a means for creating at least one user-generated replacement type for a basic type provided by a programming language. In one of these embodiments, a user may use the at least one replacement type and existing programming language mechanisms to create replacement types.

An identification of initialization, by a constructor, of an instance of the at least one replacement type is received (step 304). In some embodiments, the type model registry 206 in the type analysis system 204 receives an identification of initialization of an instance of the at least one replacement type from a means for identifying the construction of a type. In one of these embodiments, the means for identifying the construction of the type is a constructor method. In another of these embodiments, the means for identifying the construction of the type is a default constructor method, which creates a new object instantiating the type.

In one embodiment, the type model registry 206 in the type analysis system 204 receives an identification of initialization of an instance of the at least one replacement type by a constructor and generates a type model comprising a description of a data layout of the instance of the type, responsive to the received identification. In another embodiment, the type model registry 206 is a separate, globally-accessible component with which an instantiation of a replacement type may register itself. In still another embodiment, the type model registry 206 is a separate, globally-accessible component with which components in the system such as the trial instantiation component 208 or the type model generator 210 may interact to retrieve information associated with the type.

In some embodiments, the type model registry 206 is stored in volatile memory and the type analysis is performed dynamically at runtime. In other embodiments, the type model registry 206 is stored in a persistent store, such as a file system or database. In one of these embodiments, the persistent store is used as a cache so that the type analysis system can avoid having to perform type analysis upon every invocation of a program.

In one embodiment, the type model registry 206 provides functionality for receiving registry entry messages, for returning lists of registry entries, and for clearing the registry. In another embodiment, a replacement type includes a customized constructor method. In still another embodiment, a replacement type includes a standard constructor method. In still even another embodiment, the type model registry 206 receives the identification of the initialization of an instance of the replacement type when, upon running the constructor, a newly-initialized object registers itself with a type model registry 206. In yet another embodiment, the constructor sends the type model registry 206 the identification of the initialization of an instance of the replacement type during a trial instantiation of the replacement type. In some embodiments, a sequence of calls from the constructors form a description of the components of a composite type. In one of these embodiments, this description is stored in an intermediate representation and referred to as a "type model."

In one embodiment, the type model registry 206 receives an identification of a destruction of an instance of the at least one replacement type by a destructor. In another embodiment, the type model registry 206 receives an identification of an initialization of an instance of one of a plurality of basic types in a composite type. In still another embodiment, the type model registry 206 receives an identification of an initialization of an instance of one of a plurality of replacement types in a composite type.

In one embodiment, the type model registry 206 receives an identification of at least one attribute associated with each of the plurality of replacement types in a composite type. In another embodiment, the type model registry 206 receives an identification of an attribute associated with the instance of the at least one replacement type. Examples of attributes include, but are not limited to, identification of input and output types, of level of constantness, of memory or processor affinity, of locality, and of preferred memory alignment or layout. In still another embodiment, the type model registry 206 uses construction side-effects of a type to identify a change in an attribute associated with the instance of the at least one replacement type.

In one embodiment, the type model registry 206 accesses a stack storing at least one attribute associated with a replacement type. In another embodiment, the type model registry 206 accesses an identifier of an attribute in the stack, such as an attribute flag, to determine whether the attribute is associated with the replacement type. In still another embodiment, the type model registry 206 modifies an identifier of an attribute in the stack, such as an attribute flag, to associate the attribute with the replacement type.

In one embodiment, the type model registry 206 receives an identification of an operation associated with the instance of the at least one replacement type. Examples of operations include, but are not limited to, arithmetic operations, bit manipulation operations, logical operations, control flow operations, conditional assignment operations, synchronization operations, or memory access operations. In another embodiment, the type model registry 206 uses construction side-effects of a type to identify an operation modifying an attribute stack associated with a type. In still another embodiment, the type model registry 206 identifies a change in an association between an attribute and a replacement type, responsive to a construction side-effect of the replacement type. In yet another embodiment, the type model registry 206 identifies a change in an attribute stack, such as a modification to an attribute flag, responsive to a construction side-effect of a replacement type.

In one embodiment, to perform type analysis of a replacement type containing a plurality of component types, such as a plurality of replacement types or a plurality of basic types, a trial instantiation of the replacement type is performed and an identification of initialization, by a constructor, of each instance of the at least one replacement type in the plurality of component types is received. In some embodiments, the replacement type includes an instruction to declare a trial instance of the type. In one of these embodiments, a component type in the plurality of component types in the replacement type includes an instruction to declare a trial instance of the type. In another of these embodiments, the trial instantiation component 208 performs a trial instantiation of the at least one replacement type. In still another of these embodiments, a constructor initiates the trial instantiation of the at least one replacement type. In still even another of these embodiments, a customized constructor initiates the trial instantiation of the at least one replacement type. In yet another of these embodiments, a default constructor associated with the type initiates the trial instantiation of the at least one replacement type.

In some embodiments, a trial instantiation of one of the plurality of replacement types is generated to detect the side effects of instantiating the type. In other embodiments, detected side effects are recorded with a type model registry 206. In still other embodiments, trial instantiation is used in cases where the element type needs to be analyzed (i.e. its structure and components identified) before the data structure is built, such as in the construction of an array of replacement types (e.g., Array<Type>).

In some embodiments, a constructor performs a trial instantiation for the type. In one of these embodiments, the replacement type is a composite of a plurality of components, such as a composite of a plurality of replacement types or a composite of a plurality of basic types. In another of these embodiments, the constructor constructs a trial instance of a component of the type, such as a replacement type in a plurality of replacement type. In still another embodiment, when an instance of a composite type is constructed, each of the components in the plurality of components are also constructed recursively, in their order of declaration, resulting in transmission of a notification of initialization of each instance of each component to the type model registry 206. In yet another embodiment, when an object of a composite type is constructed, each of the components of the composite types are also constructed recursively, in their order of declaration, resulting in the generation of a type model for each of the plurality of types in the replacement type.

In one embodiment, the type model registry 206 receives a notification of an initialization of each instance of each of the component types from the constructors of each of the plurality of types in a composite type, in the order in which the instances of the types were initialized. In another embodiment, each of these notifications may convey information to the type model registry 206, which can then build up a type model of the internal structure of the composite type.

For example, and in one embodiment, where a composite type S1, such as a struct or a class, contains the following basic types:

```
struct S1 {
    float a;
    int b;
    bool c;
    float d[4];
};
``` and where a user replaces the basic types with following equivalent replacement types:

```
struct S2 {
    Value1f a;
    Value1i b;
    Value1bool c;
    Value4f d;
};
``` the type model of the replacement type resulting from type analysis and trial instantiation of the struct S2 could be represented symbolically as follows:

```
(
    (FLOAT,1),
    (INT,1),
    (BOOL,1),
    (FLOAT,4)
)
```

In other embodiments, the type model could include additional information, such as address, binding type, etc., for each component in the replacement type. In still other embodiments, the type model could be recursive, since a composite type could contain other composite types, as in the case of a type defining an array. In yet other embodiments, the type model could contain information comparable to that stored in a database schema.

In some embodiments, the type model registry 206 receives a second identification of an initialization of an instance of a type, such as a second replacement type in a plurality of replacement types in a composite type. In one of these embodiments, the at least one replacement type is a composite type comprising a plurality of replacement types. In another of these embodiments, the at least one replacement type is a composite type comprising a plurality of basic types.

In another of these embodiments, the type model registry 206 receives a plurality of identifications of initialization of a plurality of instances of one or more replacement types. In still another of these embodiments, the type model registry 206 receives a sequence of identifications of initialization of a plurality of instances of one or more replacement types. In yet another of these embodiments, a type model is generated comprising a description of a data layout of the instance of the at least one of the plurality of replacement types, responsive to the second received identification.

In some embodiments, the type model registry 206 receives multiple identifications of the initialization of multiple instances of the type. In other embodiments, the type model registry 206 receives multiple identifications of the initialization of instances of multiple types. In one of these embodiments, the type model registry 206 receives a sequence of notifications of the initialization of instances of each of the plurality of replacement types in a composite replacement type.

In some embodiments, the type model registry 206 receives a notification of an enabled state. In one of these embodiments, the enabled state is a non-local state. In another of these embodiments, the enabled state is a global state. In other embodiments, the identification of the enabled state is associated with the instance of the at least one replacement type. In still other embodiments, the enabled state includes an attribute, which the type model registry 206 associates with an instantiation of a type upon receiving a notification of the instantiation. For example, and in some of these embodiments, the type model registry 206 may mark an instantiation of a type as having a particular characteristic upon receiving an identification of an enabled state identifying the characteristic to the type model registry 206 (characteristics may include, for example, marking a type as having a type of alignment, or as being an input or an output to a program being constructed). In one of these embodiments, for example, a flag in the type model registry 206 might be set to indicate whether type models being added after the setting of the flag should be associated with the attribute. For example, the following sample code describes one embodiment of an identification of an enabled state and associating the state with an instantiated type:

```
Type a;
TypeModelRegistryInstance->enable_attribute( );
Type b, c;
TypeModelRegistryInstance->disable_attribute( );
Type d
```

In this embodiment, when the type models for b and c are gathered in the type model registry 206, they will be associated with the enabled attribute, whereas the type models for a and d will not. In other embodiments, in which a language supporting generics, such as C++ (in C++, this is exposed using the class template mechanism), one can construct a class that wraps an arbitrary class, setting the attribute upon construction, constructing the basic (or other) type passed to it, and then resetting the attribute, e.g.:

```
Type a;
Attribute<Type> b, c;
Type d;
```

In some embodiments, a stack of enablement flags allow the current enablement states of each attribute to be pushed and popped in a nested fashion before and after a trial instantiation. This permits the structure of nested types to be analyzed. In one of these embodiments, the stack can be pushed and popped in the constructor before and after a trial instantiation. In other embodiments, an attribute manipulation type can be used whose constructor enables or disables an attribute flag, or pushes or pops the attribute stack, so that the side effect of the order of construction can be used to capture the nested structure of derived types. In one of these embodiments, and for example, such an attribute manipulation type provides an alternative mechanism for setting attributes and may be implemented as follows:

```
struct {
    Attrib_Push dummy_1;
    AttribA_Set dummy_2;
    Type a;
    Attrib_Pop dummy_3;
    Type b;
} S;
```

In this embodiment, a programming languages is used where the constructors of component types will be called in order. The Attrib_* types represent "dummy" types whose constructor pushes the previous attribute settings, AttribA_Set and enables a flag for Attribute A, while Attrib_Pop restores the previous attributes. In another of these embodiments, the stack can be manipulated explicitly in order for the user to explicitly communicate a desired nested type structure. In still another of these embodiments, the superclass and subclass structure of the host programming language can be used, along with the known order of construction of superclasses and subclasses, to manipulate the attribute stack during instantiation of a parameter type.

In another embodiment, the following code results in an association between basic types b and c and the enabled attribute:

```
Type a;
// Attribute "b" constructor:
    TypeModelRegistryInstance->enable_attribute ( );
    Type b;
    TypeModelRegistryInstance->disable_attribute ( );
// Attribute "c" constructor:
    TypeModelRegistryInstance->enable_attribute ( );
    Type c;
    TypeModelRegistryInstance->disable_attribute ( );
Type d
```

A type model is generated responsive to the received identification, the type model comprising a description of a data layout of the instance of the type (step 306). In one embodiment, the type model includes a description of a data layout of the instance of a replacement type. In another embodiment, the type model includes a description of a data layout of the instance of a composite replacement type. In still another embodiment, the type model includes a description of a data layout of the instance of a composite basic type.

In one embodiment, the type model registry 206 generates a type model. In another embodiment, the type model registry 206 includes a type model generator 210 that generates the type model for the type. In still another embodiment, the type model registry 206 stores information comprising a type model. In still even another embodiment, a type model comprises an enumeration of initialized instances of a plurality of replacement types. In yet another embodiment, type model comprises an enumeration of initialized instances of a plurality of nested replacement types.

In one embodiment, a mechanism referred to as subclassing is provided to allow a user to define user-generated replacement types by modifying or extending an existing replacement type. Such a user-generated, replacement type may be referred to as a "subclass" or "derived type" of the type from which it inherits. For example, a user might use the following to declare a derived type:

```
struct S: public Type {
    // methods giving new behavior built on functionality of the Type
       given here
};
```

In another embodiment, a mechanism referred to as delegation is provided to allow a user to define user-generated replacement types by enclosing one replacement type with a mechanism to create a composite type. For example, a user might use the following to declare a composite type S

```
struct S {
    AttribA<Type> a;
    Type b;
    // member functions giving new behavior built on functionality of Type
       here
};
``` where type S is a struct containing both a and b as components, and where Type is a replacement type replacing a basic type. In another embodiment, and as an example, the user might then want to instantiate this type with a new attribute B, so they might then declare:

AttribB<S>q;

where q.a has both AttribA and AttribB, but q.b has only AttribB. In some embodiments, such a nested attribute definition can be implemented with a stack in the constructor. In other embodiments, a type model for such a nested attribute definition may be generated during trial instantiation.

In some embodiments, a type model comprises a description of an operation used to implement the instance of the at least one replacement type. In other embodiments, a type model comprises a description of an operation associated with the instance of the at least one replacement type.

In one embodiment, the type model registry 206 associates a generated type model with the instance of the at least one replacement type. In another embodiment, the generated type model includes a description of a data layout of an instantiation of a type. In still another embodiment the generated type model includes a runtime-accessible representation of at least one characteristic of the type. In still even another embodiment, the generated type model includes an attribute associated with the type, such as an identification of whether the type is an input or an output.

In some embodiments, the type model registry 206 stores the generated type model in storage device 212. In some embodiments, the storage device 212 stores data in a database, such as a relational database or an ODBC-compliant database. For example, the storage device 212 may be provided as an ORACLE database, manufactured by Oracle Corporation of Redwood Shores, Calif. In other embodiments, the storage device 212 can be a Microsoft ACCESS database or a Microsoft SQL server database, manufactured by Microsoft Corporation of Redmond, Wash.

In some embodiments, the storage device 212 stores data in the file system. In other embodiments, the storage device 212 may be stored in volatile memory and may be reconstructed when the program is executed. In still other embodiments, the storage device 212 may use a hierarchical memory system with some data elements stored in volatile memory and some data elements stored in persistent storage. In one of these embodiments, a cache architecture emulates dynamic type analysis while avoiding repeated type analysis on multiple runs of the same program.

In one embodiment, the use of type analysis in code generation refers to a method by which the identified structure of the type can be used to generate a more efficient implementation with a staged or runtime compiler. In some embodiments, a method for type analysis allows a more efficient implementation to appear to the programmer as an instance of the original type. In one of these embodiments, code to translate to and from the more optimized implementation may be automatically generated. Type analysis can be used as part of a system for optimizing the parallelization of computer code for use with massively parallel co-processors but its use is not limited to this application: it can be used as part of any system that compiles code for a high-performance processor.

Data types in any programming language are defined by a set of basic types and a set of mechanisms for combining these basic types into derived types. In one embodiment of a method for using type analysis to generate an implementation of a type, a type translator analyzes a derived type declared in a host language by overloading the dynamic construction side-effects of the basic types used in the derived type. In another embodiment, this can be done, for example, and as described above in connection with FIGS. 2-3, by defining types in the host language that mimic the behavior of the desired base types but use instrumented construction procedures. In still another embodiment, the user defines a type using mechanisms for combining types provided by a programming language. When this type is used in an interface to a staged or dynamic compilation system, the system can enter a type analysis mode and create a trial instantiation of this type. During the trial instantiation process, the instrumented construction procedures will inform the compilation system of the presence of each base type in the derived type. This information can be used by the compilation system to construct an explicit model of both the structure and operations on the derived type, and to determine how the type interfaces to the rest of the user's code. This type model, which is the output of the type analysis process, can then be used for tasks including, but not limited to, more efficient implementation of user-defined data types.

Figure 4:
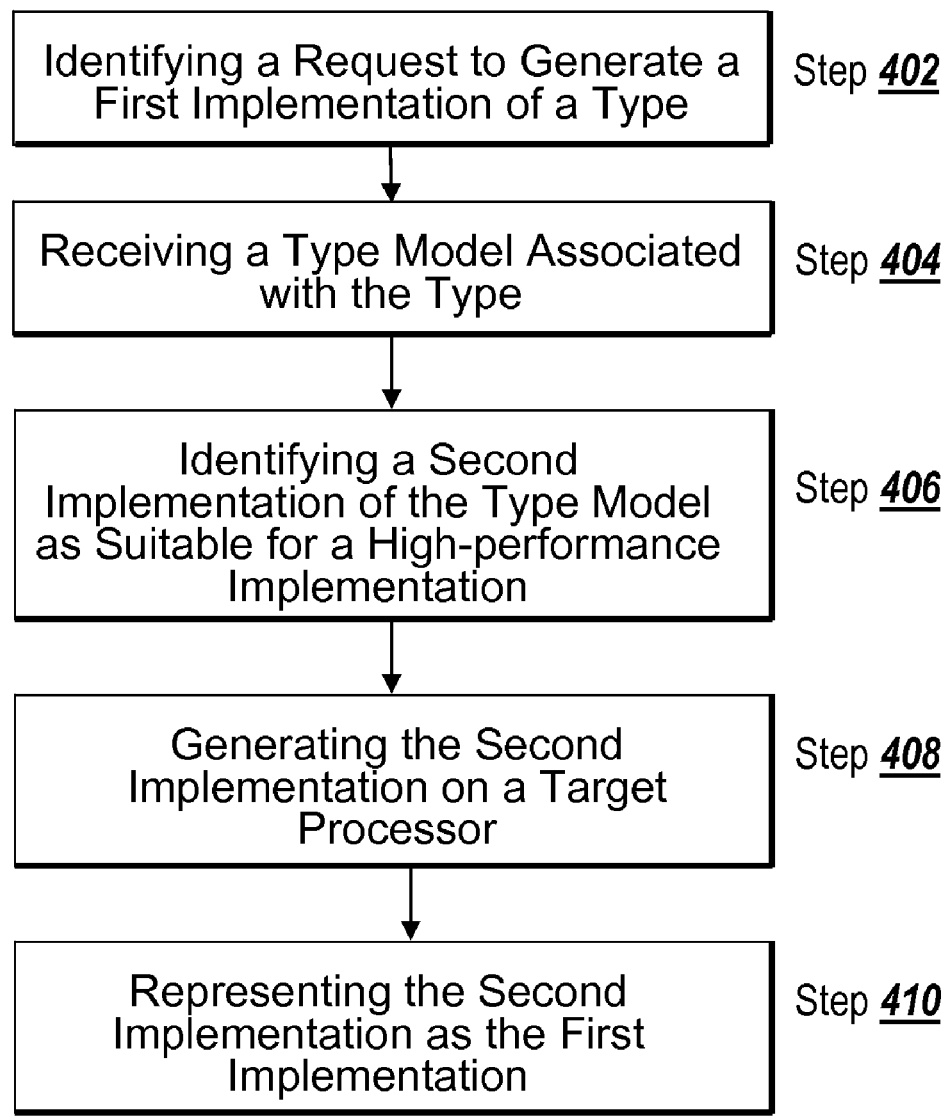
FIG. 4 is a flow diagram depicting one embodiment of the steps taken in a method for using type analysis to generate an implementation of a type.

Referring now to FIG. 4, a flow diagram depicts one embodiment of a method for using type analysis to generate an implementation of a type. A request to generate a first implementation of a type is identified (step 402). A type model associated with the type is received (step 404). A second implementation of the type model is identified as suitable for a high-performance implementation (step 406). The second implementation is generated on a target processor (step 408). The second implementation is represented as the first implementation (step 410).

In one embodiment, a type translator 222 identifies the request to generate a first implementation of a type. In another embodiment, the type translator 222 requests the type model associated with the type. In still another embodiment, the type translator 222 analyzes the type model and generates a modified version of the type model. In some embodiments, implementations of the modified version of the type model will be more suitable for a high-performance implementation than implementations of the type model originally requested. In one of these embodiments, a code generator 224 generates an implementation of the modified version of the type model. In another of these embodiments, implementation of the modified version of the type model results in dynamic generation of code that is more appropriate for the target processing unit 250 and for parallel execution.

Referring now to FIG. 4, in greater detail and in connection with FIG. 2, a request to generate a first implementation of a type is identified (step 402). In one embodiment, a type translator 222 identifies the request. In another embodiment, a generator 220 identifies the request. In some embodiments, the request is program code including an instruction to generate the first implementation. In one of these embodiments, the type translator 222 identifies an instruction in binary code to generate a first implementation of a type.

In one embodiment, the type translator 222 receives code including the request. In another embodiment, the code includes an identifier of the request. For example, a pair of variables in the code may identify a first subset of the code as including at least one request for generation of the first implementation. In another example, a first variable identifies an initial line of a subset of code including a request for generation of the first implementation and a second variable identifies a final line of the subset of code.

A type model associated with the type is received (step 404). In one embodiment, the type model is received from a type analysis system. In another embodiment, the type model is received from a programmer using type analysis to generate an implementation of a type. In still another embodiment, a programmer provides the type model via an applications programming interface. In yet another embodiment, a type translator 222 receives the type model.

In one embodiment, the type model includes a description of a data layout of an implementation of the type. In another embodiment, the type translator 222 analyzes the received type model. In still another embodiment, the type translator 222 communicates with the type analysis system 204, which generates the type model. In yet another embodiment, the type translator 222 includes a dynamic link to the type analysis system 204. In some embodiments, the type translator 222 includes a receiver retrieving the type model from a storage device.

In one embodiment, the type translator 222 receives binary code with embedded program objects from a type analysis system 204. In another embodiment, the type translator 222 receives a platform-independent, data-parallel program description from a type analysis system 204.

In one embodiment, the type model is associated with a data type. In another embodiment, the type model is associated with a function type. In still another embodiment, the type model is associated with a type replacing a basic type provided by a programming language. In still even another embodiment, the type model is associated with a composite type comprising a plurality of basic types. In yet another embodiment, the type model is associated with a composite type comprising a plurality of types replacing basic types.

In one embodiment, the type model is associated with a type associated with an interface. In another embodiment, the type model is associated with a type associated with at least one operation. In still another embodiment, the type model includes a description of a sequence of instructions used to implement an operation associated with the type. In yet another embodiment, the type model includes a description of a data layout of an implementation of the type.

In one embodiment, the type model includes a description of a relationship between an implementation of the type model and a non-local variable. In another embodiment, the type model represents a data layout of an implementation of the type and represents an operation associated with an implementation of the type. In still another embodiment, the type model represents a data layout of an implementation of the type and represents an arithmetic operation associated with an implementation of the type. In yet another embodiment, the type model represents a data layout of an implementation of the type and represents a logical operation associated with an implementation of the type.

In one embodiment, an identification of the type model is received, the type model including an identifier of at least one basic type. In another embodiment, an identification of the type model is received, the type model including an identifier of a composite type comprising a plurality of basic types. In still another embodiment, an identification of the type model is received, the type model including an identifier of a composite type comprising a plurality of replacement types. In still even another embodiment, an identifier of a state field comprising a plurality of values is received, one of the plurality of values associated with an implementation of the type model. In yet another embodiment, an identifier of an operation associated with an implementation of the type model is received.

In one embodiment, an identification of a type model is received, the type model generated responsive to an analysis of the type. In another embodiment, the identification of the type model is received from a constructor. In still another embodiment, the identification of the type model is received from a type analysis system. In still even another embodiment, the identification of the type model is received from a type model registry. In yet another embodiment, the identification of the type model is received by a compiler.

A second implementation of the type model is identified as suitable for a high-performance implementation (step 406). In one embodiment, the type translator 222 identifies a second type model as suitable for a high-performance implementation. In another embodiment, the second implementation is identified responsive to an analysis of the type model. In still another embodiment, the second type model is different from the first type model. In another embodiment, second type model and the first type model comprise the same type model.

In some embodiments, a modification is made to the type model. In one of these embodiments, the type translator 222 modifies the type model. In another of these embodiments, the code generator 224 generates an implementation of the modified type model. In still another of these embodiments, the type translator 222 generates a second type model suitable for a high-performance implementation. In yet another of these embodiments, the code generator 224 generates an implementation of the second type model.

In some embodiments, the type model is a description of the components in a replacement type, the description stored in an intermediate representation. In one of these embodiments, the description in the intermediate representation is translated into a representation suitable for an individual backend. In another of these embodiments, the type translator transforms the type model to make it possible to build a more efficient implementation on a particular target processing unit 250, for instance, by padding the data structure to improve alignment.

In some embodiments, the second implementation has a data layout satisfying a requirement of a target processing unit 250. In one of these embodiments, the second implementation has a data layout satisfying an alignment requirement of the target processing unit 250. In another of these embodiments, the second implementation has a data layout satisfying a padding requirement of the target processing unit 250. In still another embodiment, the second implementation has a data layout avoiding a cache conflict on the target processing unit 250.

In one embodiment, a second implementation of the type model is identified, the second implementation having a data layout optimizing data transfer rates on the target processor. In another embodiment, a second implementation of the type model is identified, the second implementation having a data layout that uses compression to minimize storage space. In still another embodiment, a second implementation of the type model is identified, the second implementation having a data layout that adapts the data to the byte order of the target processor.

The second implementation is generated on a target processor (step 408). In one embodiment, a code generator 224 generates an implementation of the second type model on a target processor. In another embodiment, the code generator 224 dynamically generates the second implementation.

In one embodiment, the code generator 224 generates an implementation optimized for a parallel computer, including multiple processors. In another embodiment, the code generator 224 generates an implementation optimized for a graphics processor. In still another embodiment, the code generator 224 generates an implementation optimized for a multi-core platform. In yet another implementation, the code generator 224 generates an implementation optimized for a distributed memory system.

In one embodiment, the code generator 224 generates an implementation optimized for a digital signal processor. In another embodiment, the code generator 224 generates an implementation optimized for a reconfigurable logic processor. In another embodiment, the code generator 224 generates an implementation optimized for a field-programmable gate array.

The second implementation is represented as the first implementation (step 410). In one embodiment, a code generator 224 generates a representation of the generated implementation as the first implementation. In another embodiment, the code generator 224 identifies a first interface associated with the type model and associates a second interface with the second implementation, the second interface substantially similar to the first interface. In still another embodiment, the code generator 224 provides a translation mechanism for translating input to the first interface into a format accepted by the second interface. In yet another embodiment, the code generator 224 provides a translation mechanism for translating output from the second interface into a format accepted by the first interface. In some embodiments, the translation mechanisms reside in the type translator 222. In other embodiments, the code generator 224 includes a runtime system interacting with the implementation of the second type model on the target processor and representing the generated implementation as the first implementation.

In some embodiments of a method for identifying a structure of a type to generate a model of the type, a dynamic construction side-effect of a subtype associated with the first type is overloaded. In one of these embodiments, a method for using type analysis to generate an implementation of a type accesses a type model generated by the method to generate more efficient implementations of user-defined data types. In some embodiments, a replacement type declared in a host programming language is analyzed as part of a method for type analysis. In one of these embodiments, the replacement type is a composite type and includes sub-types having dynamic construction side effects. In another of these embodiments, a dynamic construction side effect of a sub-type in the replacement type is overloaded. For example, and in some embodiments, in C++, a user can create COMPOSITE types like structs or classes where a collection of instances of the basic types are collected together to make a compound type. For example, a programmer might have previously defined the following structure:

```
struct Triangle_f {
    float vertex[3][3];
    float normal[3][3];
};
``` and the programmer can now create a new type by replacing "float" with "Value1f":

```
struct Triangle_v {
    Value1f vertex[3][3];
    Value1f normal[3][3];
};
```

It is also possible in C++ to use a generic type:

```
template <typename T>
struct Triangle {
    T vertex[3][3];
    T normal[3][3];
};
``` and then instantiate it using either the original basic type or its replacement basic type:

```
Triangle<float> tri1; // using basic type float
Triangle<Value1f> tri2; // using replacement basic type Value1f
```

In one embodiment, when a Triangle<Value If> is instantiated, the constructors of Value If used will be called in order and side effects of these constructors can make calls into the type model registry 206 to record what base types are needed in the host implementation of the Triangle<Value1f> type and how they are laid out in memory.

In one embodiment, the results of this type analysis (stored in an intermediate representation and referred to as a type model) can used, for example, in the definition of a program object that acts on an input triangle and generates an output triangle:

```
Program operate = BEGIN {
    In<Triangle<Value1f>> a;
    Out<Triangle<Value1f> b;
    (some operations generating b from a)
} END;
Array<1,Triangle<Value1f>> A, B;
B = operate(A);
```

In this example, type analysis is used to analyze the implementation of Triangle in the In and Out type modifiers so that an appropriate interface to the program object "operate" can be generated. Likewise, type analysis is used in the declaration of the arrays A and B so that (for example) an efficient layout of the basic types used in the Triangle data type can be selected for the target processor. These are only meant to be examples of the use of type analysis, as it is possible to use the type models returned by the type analysis process in other applications, with other programming languages than C++, and with other interface designs.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, including, but not limited to, LISP, PERL, C, C++, PROLOG, or any byte code language such as JAVA. The software programs may be stored on or in one or more articles of manufacture as object code.

Having described certain embodiments of methods for using type analysis to generate an implementation of a type in a system for code generation, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. A method for using data type analysis to generate an implementation of a data type, the method comprising:
   identifying a request to generate a first implementation of a data type;
   receiving a type model associated with the data type;
   identifying a second implementation of the type model as suitable for a high-performance implementation;
   generating the second implementation on a target processor; and
   representing the second implementation as the first implementation.

2. The method of claim 1, wherein identifying a second implementation of the type model as suitable for a high-performance implementation further comprises identifying a second implementation of the type model as suitable for a high-performance implementation, responsive to an analysis of the type model.

3. The method of claim 1, wherein identifying a second implementation of the type model as suitable for a high-performance implementation comprises modifying the type model.

4. The method of claim 3, wherein generating the second implementation on a target processor comprises generating an implementation of the modified type model.

5. The method of claim 1, wherein receiving a type model associated with the type further comprises receiving the type model from a system for type analysis.

6. The method of claim 1, wherein receiving a type model associated with the type further comprises receiving the type model from a user.

7. The method of claim 1, wherein receiving a type model associated with the data type further comprises receiving the type model from a programmer via an applications programming interface.

8. The method of claim 1, wherein receiving a type model associated with the data type further comprises receiving a type model associated with a data type.

9. The method of claim 1, wherein receiving a type model associated with the data type further comprises receiving a type model associated with a function type.

10. The method of claim 1, wherein receiving a type model associated with the data type further comprises receiving a type model associated with a type replacing a basic type provided by a programming language.

11. The method of claim 1, wherein receiving a type model associated with the data type further comprises receiving a type model associated with a composite type comprising a plurality of basic types.

12. The method of claim 1, wherein receiving a type model associated with the data type further comprises receiving a type model associated with a composite type comprising a plurality of types replacing basic types.

13. The method of claim 1, wherein receiving a type model associated with the data type further comprises receiving a type model associated with a type, the type associated with an interface.

14. The method of claim 1, wherein receiving a type model associated with the data type further comprises receiving a type model associated with a type, the type associated with at least one operation.

15. The method of claim 1, wherein receiving a type model associated with the data type further comprises receiving a description of a sequence of instructions used to implement an operation associated with the type.

16. The method of claim 1, wherein receiving a type model associated with the data type further comprises receiving a description of a data layout of an implementation of the type.

17. The method of claim 1, wherein receiving a type model associated with the data type further comprises receiving a description of a relationship between an implementation of the type model and a non-local variable.

18. The method of claim 1, wherein receiving a type model associated with the data type further comprises receiving a type model representing a data layout of an implementation of the type and representing an operation associated with an implementation of the type.

19. The method of claim 18, wherein receiving a type model associated with the data type further comprises receiving a type model representing a data layout of an implementation of the type and representing an arithmetic operation associated with an implementation of the type.

20. The method of claim 18, wherein receiving a type model associated with the data type further comprises receiving a type model representing a data layout of an implementation of the type and representing a logical operation associated with an implementation of the type.

21. The method of claim 1, wherein receiving a type model associated with the data type further comprises receiving an identification of a type model, the type model including an identifier of at least one basic type.

22. The method of claim 1, wherein receiving a type model associated with the data type further comprises receiving an identification of a type model, the type model including an identifier of a composite type comprising a plurality of basic types.

23. The method of claim 1, wherein receiving a type model associated with the data type further comprises receiving an identification of a type model, the type model including an identifier of a composite type comprising a plurality of replacement types.

24. The method of claim 1, wherein receiving a type model associated with the data type further comprises receiving an identifier of a state field comprising a plurality of values, one of the plurality of values associated with an implementation of the type model.

25. The method of claim 1, wherein receiving a type model associated with the data type further comprises receiving an identifier of an operation associated with an implementation of the type model.

26. The method of claim 1, wherein receiving a type model associated with the data type further comprises receiving an identification of a type model, the type model generated responsive to an analysis of the type.

27. The method of claim 1, wherein receiving a type model associated with the data type further comprises receiving, from a constructor, the identification of the type model.

28. The method of claim 1, wherein receiving a type model associated with the data type further comprises receiving, from a type analysis system, the identification of the type model.

29. The method of claim 1, wherein receiving a type model associated with the data type further comprises receiving, by a compiler, the identification of the type model.

30. The method of claim 1, wherein identifying a second implementation of the type model as suitable for a high-performance implementation further comprises identifying, by a type translation component, a second implementation of the type model as suitable for a high-performance implementation.

31. The method of claim 1, wherein identifying a second implementation of the type model as suitable for a high-performance implementation further comprises identifying a second implementation of the type model, the second implementation having a data layout satisfying a requirement of a target processor.

32. The method of claim 1, wherein identifying a second implementation of the type model as suitable for a high-performance implementation further comprises identifying a second implementation of the type model, the second implementation having a data layout satisfying an alignment requirement of a target processor.

33. The method of claim 1, wherein identifying a second implementation of the type model as suitable for a high-performance implementation further comprises identifying a second implementation of the type model, the second implementation having a data layout satisfying a padding requirement of a target processor.

34. The method of claim 1, wherein identifying a second implementation of the type model as suitable for a high-performance implementation further comprises identifying a second implementation of the type model, the second implementation having a data layout avoiding a cache conflict on the target processor.

35. The method of claim 1, wherein identifying a second implementation of the type model as suitable for a high-performance implementation further comprises identifying a second implementation of the type model, the second implementation having a data layout optimizing data transfer rates on the target processor.

36. The method of claim 1, wherein identifying a second implementation of the type model as suitable for a high-performance implementation further comprises identifying a second implementation of the type model, the second implementation having a data layout that uses compression to minimize storage space.

37. The method of claim 1, wherein identifying a second implementation of the type model as suitable for a high-performance implementation further comprises identifying a second implementation of the type model, the second implementation having a data layout that adapts the data to the byte order of the target processor.

38. The method of claim 1, wherein representing the second implementation as the first implementation further comprises:
    identifying a first interface associated with the type model; and
    associating a second interface with the second implementation, the second interface substantially similar to the first interface.

39. The method of claim 38 further comprising providing a translation mechanism for translating input to the first interface into a format accepted by the second interface.

40. The method of claim 38 further comprising providing a translation mechanism for translating output from the second interface into a format accepted by the first interface.

41. A system for using type analysis to generate an implementation of a type comprising:
    a storage device;
    a generator coupled with the storage device, the generator comprising at least:
        a type translator identifying a request to generate a first implementation of a type, analyzing a type model associated with the type, and identifying a second type model as suitable for a high-performance implementation, the type model including a description of a data layout of an implementation of the type; and
        a code generator generating an implementation of the second type model on a target processor and representing the generated implementation as the first implementation.

42. The system of claim 41, wherein the type translator is in communication with a type analysis system generating the type model.

43. The system of claim 41, wherein the type translator further comprises a means for receiving the type model from a user.

44. The system of claim 41, wherein the type translator further comprises a means for receiving the type model from a programmer via an applications programming interface.

45. The system of claim 41, wherein the type translator comprises a means for modifying the type model.

46. The system of claim 45, wherein the code generator comprises a means for generating an implementation of the modified type model.

47. The system of claim 41, wherein the type translator further comprises a means for identifying a type model associated with a data type.

48. The system of claim 41, wherein the type translator further comprises a means for identifying a type model associated with a function type.

49. The system of claim 41, wherein the type translator further comprises a means for identifying a type model associated with a type replacing a basic type provided by a programming language.

50. The system of claim 41, wherein the type translator further comprises a means for identifying a type model associated with a composite type comprising a plurality of basic types.

51. The system of claim 41, wherein the type translator further comprises a means for identifying a type model associated with a composite type comprising a plurality of types replacing basic types.

52. The system of claim 41, wherein the type translator further comprises a means for identifying a type model of the type, the type model including a description of at least one operation associated with the type.

53. The system of claim 41, wherein the type translator further comprises a means for identifying a type model of the type, the type model including a description of an arithmetic operation associated with an implementation of the type.

54. The system of claim 41, wherein the type translator further comprises a means for identifying a type model of the type, the type model including a description of a logical operation associated with an implementation of the type.

55. The system of claim 41, wherein the type translator further comprises a means for identifying a type model associated with a type, the type associated with an interface.

56. The system of claim 41, wherein the type translator further comprises a means for identifying a type model associated with a type, the type associated with at least one operation.

57. The system of claim 41, wherein the type translator further comprises a means for generating a description of a sequence of instructions used to implement an operation associated with the type.

58. The system of claim 41, wherein the type translator further comprises a means for generating a description of a data layout of an implementation of the type.

59. The system of claim 41, wherein the type translator further comprises a means for generating a description of a relationship between an implementation of the type model and a non-local variable.

60. The system of claim 41, wherein the type translator further comprises a means for identifying a type model representing a data layout of an implementation of the type and representing an operation associated with an implementation of the type.

61. The system of claim 41, wherein the type translator further comprises a means for identifying a type model, the type model including an identifier of at least one basic type.

62. The system of claim 41, wherein the type translator further comprises a means for identifying a type model, the type model including an identifier of a composite type comprising a plurality of basic types.

63. The system of claim 41, wherein the type translator further comprises a means for identifying a type model including an identifier of a state field comprising a plurality of values, one of the plurality of values associated with an implementation of the type model.

64. The system of claim 41, wherein the type translator further comprises a means for identifying a type model including an identifier of an operation associated with an implementation of the type model.

65. The system of claim 41, wherein the type translator further comprises a means for identifying a type model, the type model generated responsive to an analysis of the type.

66. The system of claim 41, wherein the type translator further comprises a receiver retrieving the type model from the storage device.

67. The system of claim 41, wherein the type translator further comprises a means for identifying a second implementation of the type model, the second implementation having a data layout satisfying a requirement of a target processor.

68. The system of claim 41, wherein the type translator further comprises a means for identifying a second implementation of the type model, the second implementation having a data layout satisfying an alignment requirement of a target processor.

69. The system of claim 41, wherein the type translator further comprises a means for identifying a second implementation of the type model, the second implementation having a data layout satisfying a padding requirement of a target processor.

70. The system of claim 41, wherein the type translator further comprises a means for identifying a second implementation of the type model, the second implementation having a data layout avoiding a cache conflict on the target processor.

71. The system of claim 41, wherein the type translator further comprises a means for identifying a second implementation of the type model, the second implementation having a data layout optimizing data transfer rates on the target processor.

72. The system of claim 41, wherein the type translator further comprises a means for identifying a second implementation of the type model, the second implementation having a data layout that uses compression to minimize storage space.

73. The system of claim 41, wherein the type translator further comprises a means for identifying a second implementation of the type model, the second implementation having a data layout that adapts the data to the byte order of the target processor.

74. The system of claim 41, wherein the type translator further comprises a means for identifying a second type model of the type.

75. The system of claim 41, wherein the type translator further comprises a means for identifying a type model of a second type.

76. The system of claim 41, wherein the code generator further comprises: a means for identifying a first interface associated with the type model; and a means for associating a second interface with the second implementation, the second interface substantially similar to the first interface.

77. The system of claim 76 further comprising a translation mechanism translating input to the first interface into a format accepted by the second interface.

78. The system of claim 76 further comprising a translation mechanism translating output from the second interface into a format accepted by the first interface.

79. The system of claim 41, wherein the code generator further comprises a means for generating the implementation of the second type model on a parallel processor.

80. The system of claim 41, wherein the code generator for generating the second type of data structure on a target processor further comprises a means for dynamically generating the implementation of the second type model.

81. The system of claim 41, wherein the code generator further comprises a means for dynamically generating the implementation of the second type model during compilation of the instruction.

82. The system of claim 41, wherein the code generator further comprises a runtime system interacting with the implementation of the second type model on the target processor and representing the generated implementation as the first implementation.

83. The system of claim 41, wherein the code generator generates an implementation of the second type model optimized for a parallel computer.

84. The system of claim 41, wherein the code generator generates an implementation of the second type model optimized for a graphics processor.

85. The system of claim 41, wherein the code generator generates an implementation of the second type model optimized for a multi-core processor.

86. The system of claim 41, wherein the code generator generates an implementation of the second type model optimized for a digital signal processor.

87. The system of claim 41, wherein the code generator generates an implementation of the second type model optimized for a field-programmable gate array.

88. The system of claim 41, wherein the code generator generates an implementation of the second type model optimized for reconfigurable logic.

* * * * *